(12) United States Patent  
Asai

(10) Patent No.: US 9,770,964 B1
(45) Date of Patent: Sep. 26, 2017

(54) VEHICLE SUN VISOR

(71) Applicant: Kyowa Sangyo Co., Ltd., Toyota-shi, Aichi (JP)

(72) Inventor: Takashi Asai, Toyota-shi (JP)

(73) Assignee: KYOWA SANGYO CO., LTD., Toyota (JP)

( * ) Notice: Subject to any disclaimer, the term of this patent is extended or adjusted under 35 U.S.C. 154(b) by 0 days.

(21) Appl. No.: 15/277,568

(22) Filed: Sep. 27, 2016

(30) Foreign Application Priority Data

Mar. 23, 2016 (JP) .................................. 2016-058686

(51) Int. Cl.
B60J 3/02 (2006.01)
B60R 7/05 (2006.01)

(52) U.S. Cl.
CPC ........... *B60J 3/0278* (2013.01); *B60J 3/0282* (2013.01); *B60R 7/05* (2013.01)

(58) Field of Classification Search
CPC .......... B60J 3/0278; B60J 3/0282; B60R 7/05
See application file for complete search history.

(56) References Cited

U.S. PATENT DOCUMENTS

| 5,577,791 | A | * | 11/1996 | Viertel | B60J 3/0282 296/97.5 |
| 7,909,383 | B2 | * | 3/2011 | Dolisy | B60J 3/0282 296/97.1 |
| 2007/0164582 | A1 | * | 7/2007 | Ishikura | B60J 3/0278 296/97.2 |
| 2012/0112490 | A1 | * | 5/2012 | Fukatsu | B60J 3/0282 296/97.1 |

FOREIGN PATENT DOCUMENTS

| JP | H07-266877 A | 10/1995 |
| JP | H08-53025 A | 2/1996 |
| JP | H11-34660 A | 2/1999 |
| JP | 4732821 B2 | 7/2011 |

* cited by examiner

Primary Examiner — Corey Skurdal
(74) Attorney, Agent, or Firm — Oliff PLC

(57) ABSTRACT

A vehicle sun visor includes: a visor main body; and a slide component slidably mounted on the visor main body and including a slide main body, card holding parts provided so as to have clearances from the slide main body in a thickness direction, a stopper that restricts an amount of movement of a card inserted through the clearances into a gap between the slide main body and the card holding parts, the card moving along a surface of the slide main body, and a grip that protrudes from the slide main body, is gripped to slide the slide component relative to the visor main body, and serves as a part of the stopper.

11 Claims, 13 Drawing Sheets

VEHICLE SUN VISOR

INCORPORATION BY REFERENCE

The disclosure of Japanese Patent Application No. 2016-058686 filed on Mar. 23, 2016 including the specification, drawings and abstract is incorporated herein by reference in its entirety.

BACKGROUND OF THE INVENTION

1. Field of the Invention

The present invention relates to a vehicle sun visor.

2. Description of Related Art

The vehicle sun visor disclosed in Japanese Patent No. 4732821 has a mirror and a mirror cover on the surface that faces the vehicle interior in the light-blocking state of the sun visor. The mirror cover reveals and covers the mirror by turning around one end edge of the rectangular mirror that acts as a support point. A card holder is provided on the outer surface of the mirror cover. The card holder is so configured that a card is inserted into a pair of slits disposed so as to approach each other in the card insertion direction.

Another known vehicle sun visor is provided with a mirror cover that is slidable relative to the mirror.

SUMMARY OF THE INVENTION

There is a demand for a vehicle sun visor that includes a slide component like a mirror cover and is suitably provided with a card holder on the slide component.

A vehicle sun visor according to an aspect of the present invention includes: a visor main body; and a slide component slidably mounted on the visor main body and including: a slide main body; card holding parts provided so as to have clearances from the slide main body in a thickness direction; a stopper that restricts an amount of movement of a card inserted through the clearances into a gap between the slide main body and the card holding parts, the card moving along a surface of the slide main body; and a grip that protrudes from the slide main body, is gripped to slide the slide component relative to the visor main body, and serves as a part of the stopper.

According to the above aspect, the slide component can hold the card between the slide main body and the card holding parts. Thus, the slide component functions as a card holder that is slidable relative to the visor main body. The grip of the slide component combines the functions of a knob to slide the slide component and of a card stopper. Thus, the structure of the slide component is simplified compared with when the grip and the stopper are separately provided.

In the above aspect, the vehicle sun visor may include a mirror mounted on the visor main body, and the slide component may be a mirror cover that moves between a closed position in which the slide component covers the mirror and an open position in which the slide component reveals the mirror.

The mirror cover constitutes a card holder in the above configuration. Thus, compared with when the mirror cover and the card holder are separately provided on the visor main body, the number of components mounted on the visor main body can be reduced and the structure of the visor main body is simplified.

In the above aspect, a card slot into which the card is inserted may be provided between the slide main body and the card holding parts, and a direction in which the card is inserted through the card slot along the surface of the slide main body and a direction in which the slide component is slid relative to the visor main body may coincide with each other.

In the above configuration, the insertion direction of the card and the sliding direction of the slide component coincide with each other. Thus, the directions of operations of inserting the card and sliding the slide component are the same, which is convenient for a user, for example, when performing both operations in succession.

In the above aspect, the clearances between the slide main body and the card holding parts may be larger than the thickness of the card.

According to the above configuration, the clearances between the slide main body and the card holding parts are larger than the thickness of the card. Thus, when inserting and extracting the card into and from the gap between the slide main body and the card holding parts, the user encounters no resistance to the card or a smaller resistance to the card. Therefore, the user can easily insert and extract the card into and from the gap between the slide main body and the card holding parts.

Even when the insertion direction of the card and the sliding direction of the slide component are the same, unintended sliding of the slide component while the card is being inserted into the clearances can be prevented. This is because the resistance to the card encountered when the card is inserted into the clearances between the slide main body and the card holding parts is eliminated or reduced if the clearances are set to be larger than the thickness of the card.

In the above aspect, the grip that protrudes in the thickness direction relative to a plate-like main body-side holding part of the slide main body may be provided, and a slope that rises gradually in the thickness direction from the main body-side holding part toward the grip may be provided between the main body-side holding part and the grip.

In the above configuration, the slope that rises gradually in the thickness direction from the main body-side holding part toward the grip is provided between the main body-side holding part and the grip. Thus, when the user extracts the card, the card is gradually guided in the thickness direction from the main body-side holding part toward the grip. In this way, the card is smoothly extracted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
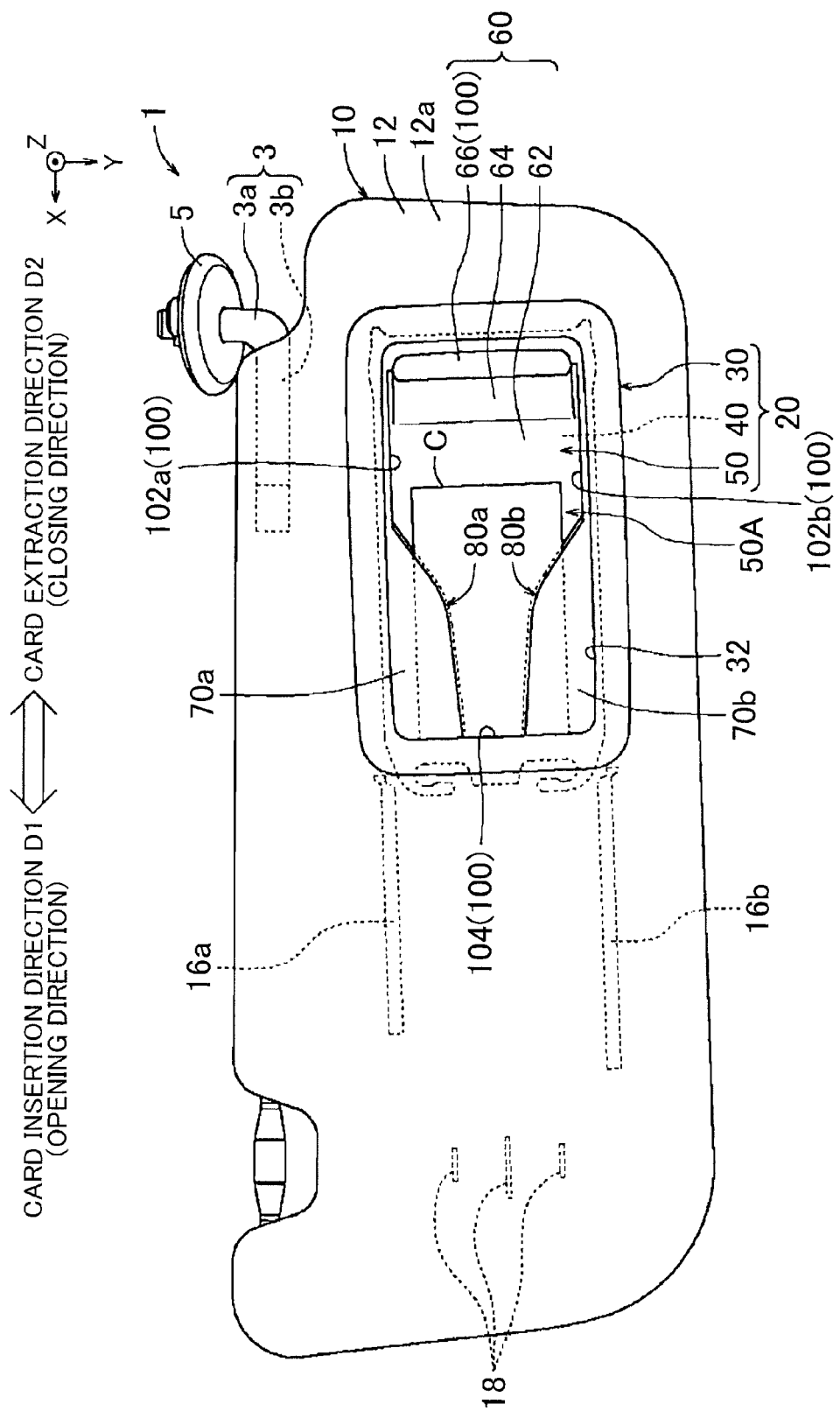
FIG. 1 is a plan view of a sun visor with a mirror cover closed.
Figure 2:
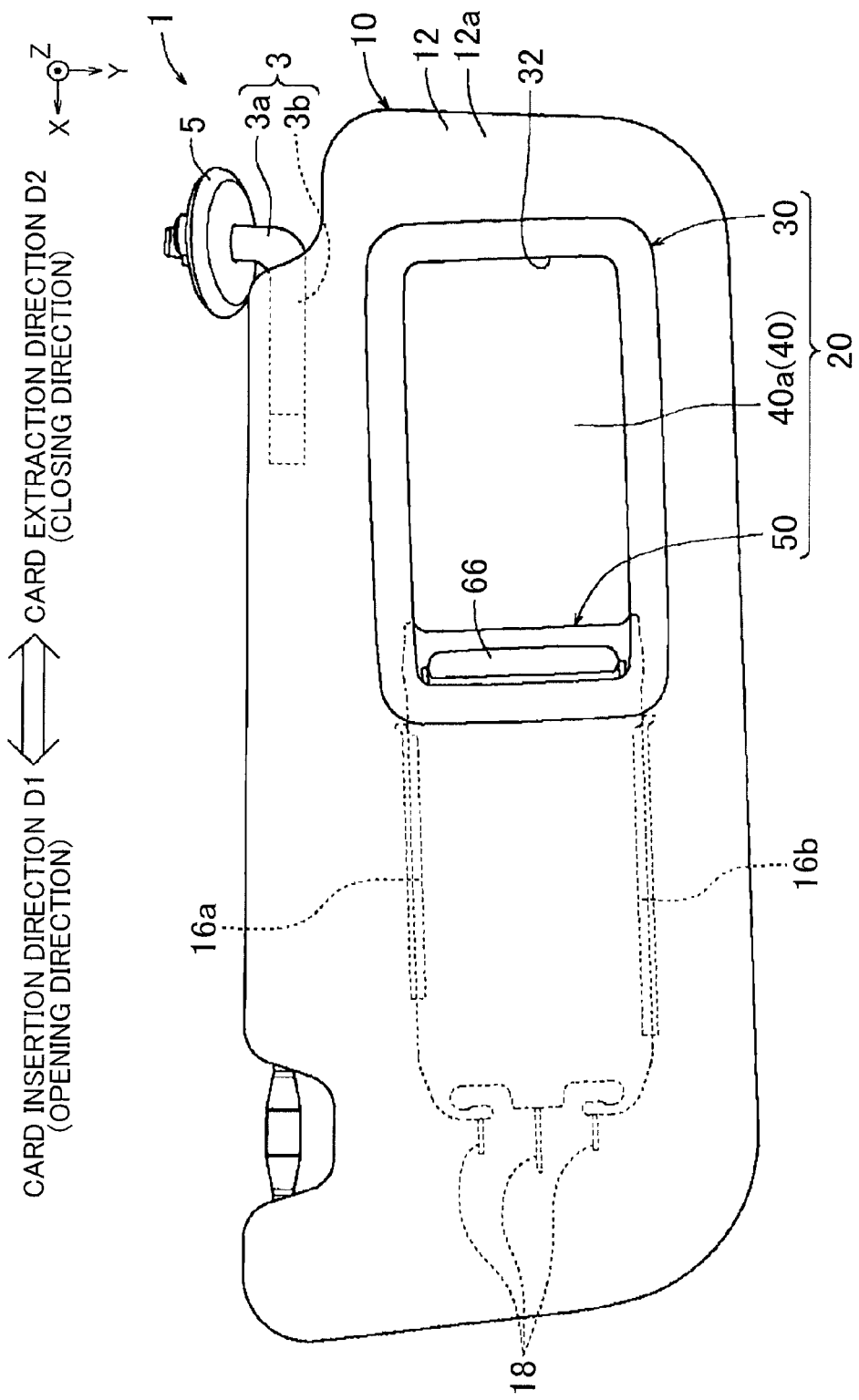
FIG. 2 is a plan view of the sun visor with the mirror cover opened.

In the following, an embodiment of the present invention will be described using the drawings. In each drawing, the X-axis, the Y-axis, and the Z-axis are orthogonal to one another. The X-axis, the Y-axis, and the Z-axis correspond respectively to the longitudinal direction, the width direction, and the thickness direction of a visor main body 10, a frame 30, a mirror 40, and a mirror cover 50 to be described later. A vehicle sun visor 1 shown in FIGS. 1 and 2 is attached at a front edge of a ceiling surface of a vehicle interior (not shown) (in the vicinity of a windshield). The vehicle sun visor 1 has the plate-like visor main body 10, a support shaft 3 supporting the visor main body 10, and a bracket 5 with which the support shaft 3 is attached to the ceiling surface of the vehicle interior.

The support shaft 3 is substantially L-shaped and has a vertical shaft 3a and a horizontal shaft 3b. The vertical shaft 3a is connected to the bracket 5. The horizontal shaft 3b is mounted on the visor main body 10 along one end edge of the visor main body 10. The visor main body 10 is turnable around the horizontal shaft 3b. By thus turning, the visor main body 10 is switched between a retracted state of being disposed along the ceiling surface of the vehicle interior and a light-blocking state of being disposed so as to face the windshield.

Figure 3:
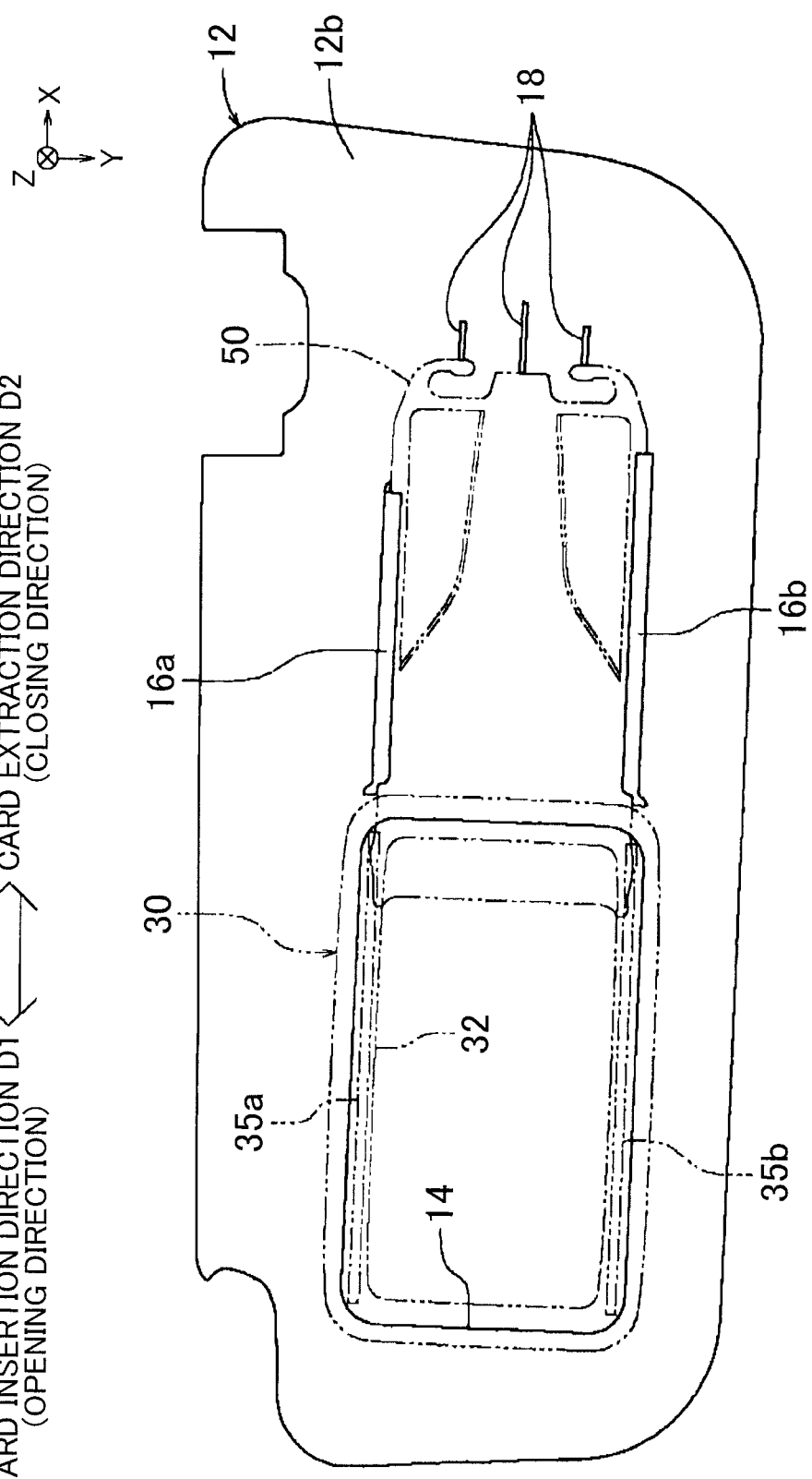
FIG. 3 is a plan view of a shell body as seen from the side of an inner surface.

The visor main body 10 is composed of two half shell bodies laid on top of each other in the thickness direction, and is hollow. FIG. 3 is a plan view of one shell body 12 as seen from the side of an inner surface 12b. The shell body 12 is located on the vehicle interior side in the light-blocking state of the visor main body 10. The shell body 12 has an open part 14 in which a mirror unit 20 to be described later is mounted, a pair of shell body rails 16a, 16b that slidably support the mirror cover 50 to be described later, and shell body stoppers 18 that restrict an amount of sliding of the mirror cover 50.

Figure 4:
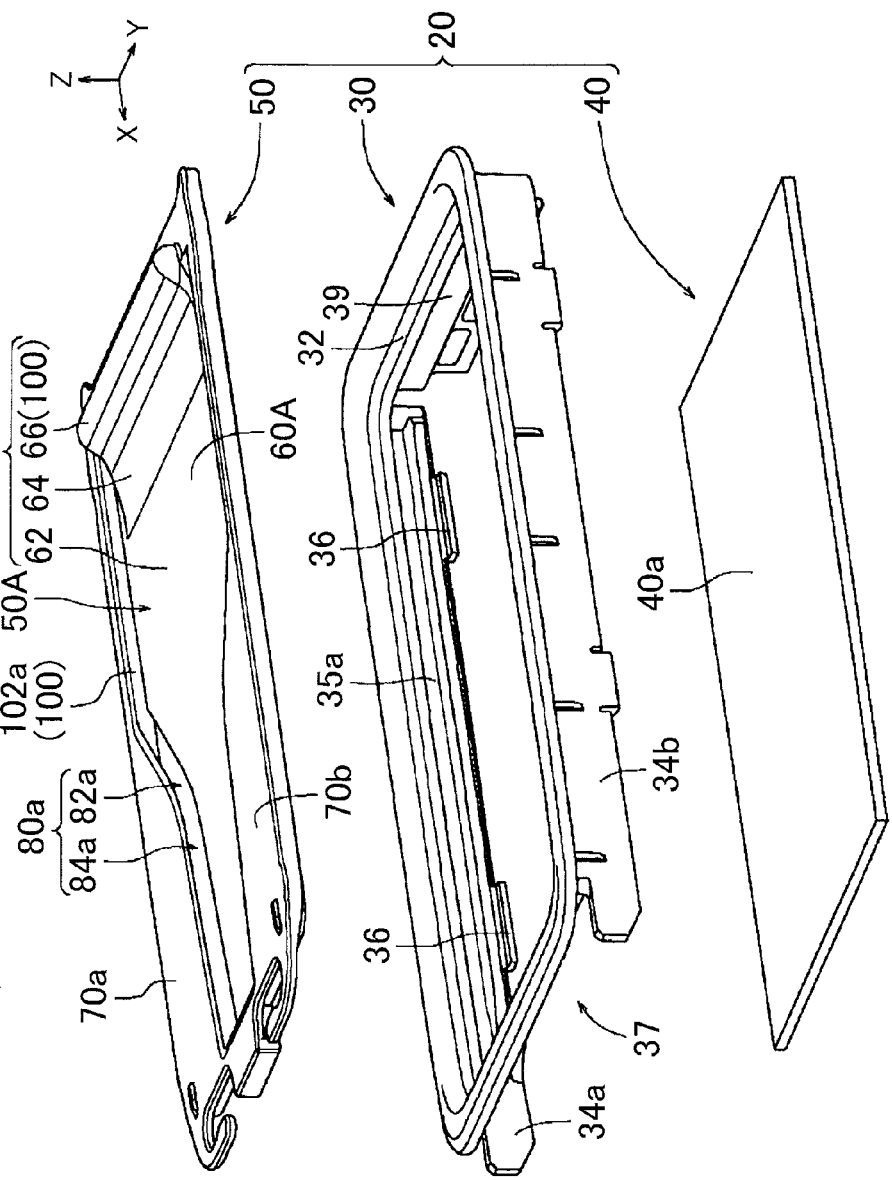
FIG. 4 is an exploded perspective view of a mirror unit.
Figure 5:
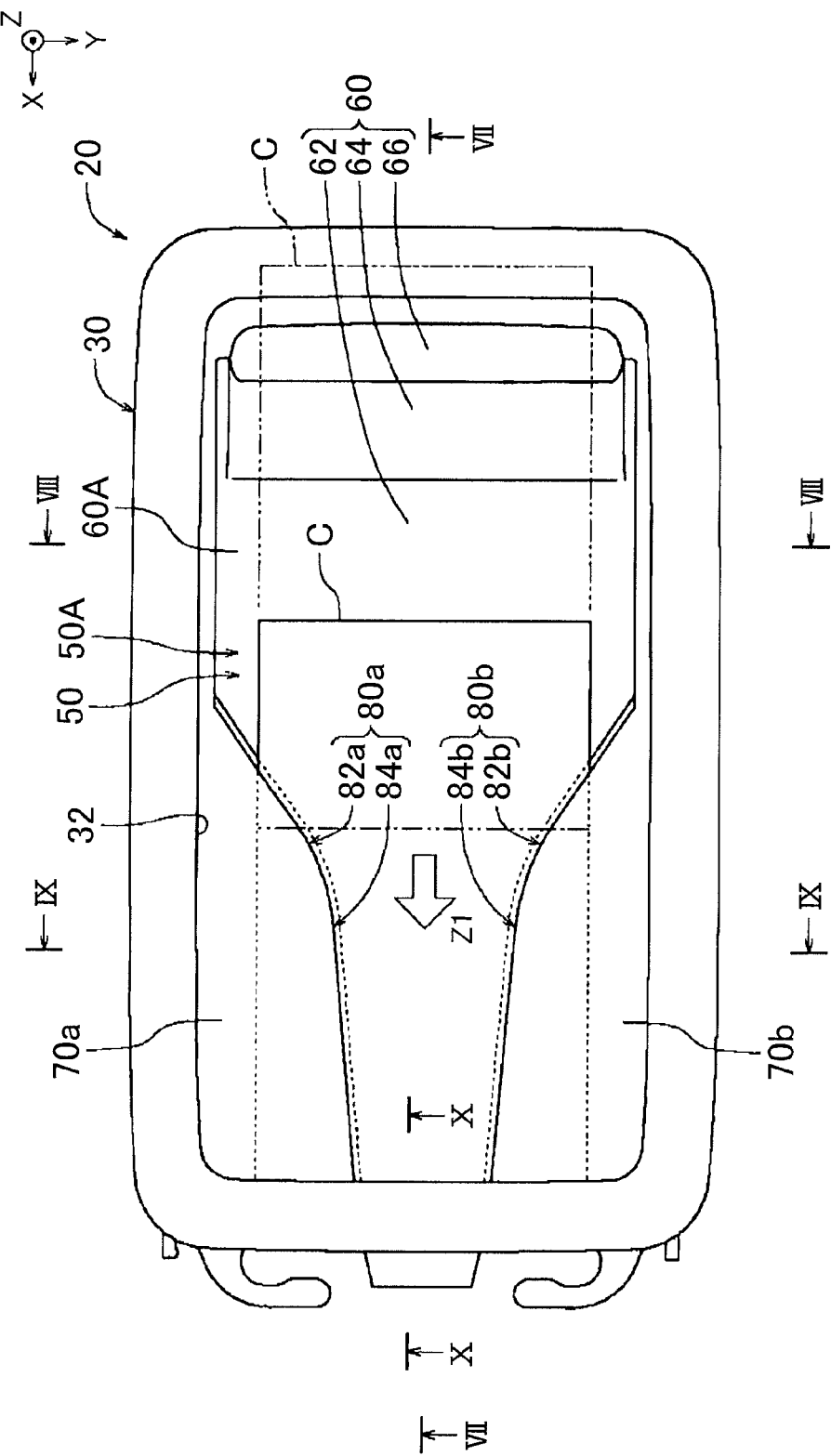
FIG. 5 is a plan view of the mirror unit.

As shown in FIGS. 1 and 2, the visor main body 10 has the mirror unit 20. As shown in FIG. 4, the mirror unit 20 has the frame 30, the mirror 40, and the mirror cover 50. As shown in FIGS. 4 and 5, in a plan view, the frame 30 has an oblong shape. The frame 30 has an oblong window 32 through which the mirror 40 is exposed, frame rails 35a, 35b (see FIGS. 8 and 9) that are a pair of rails provided respectively on both side walls 34a, 34b, mirror supports 36 provided on the lower side in the thickness direction relative to the frame rails 35a, 35b, a slide opening 37 (see FIG. 4) open between the side walls 34a, 34b on one side in the longitudinal direction, and a frame stopper 39 that blocks between the side walls 34a, 34b on the other side in the longitudinal direction. As shown in FIG. 3, the window 32 is disposed so as to correspond to the open part 14 of the shell body 12. The frame rail 35a is located on the same line as the shell body rail 16a. The frame rail 35b is located on the same line as the shell body rail 16b.

Figure 8:
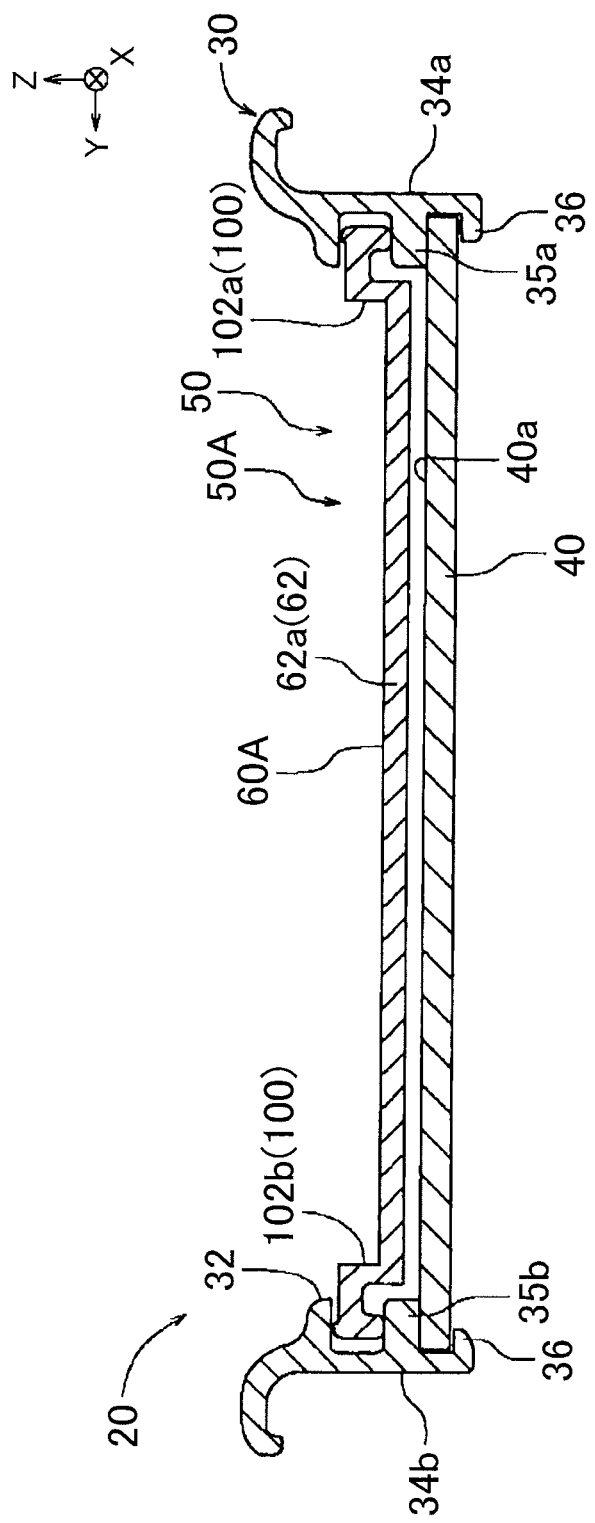
FIG. 8 is an enlarged end view taken along the arrow VIII-VIII of FIG. 5.
Figure 9:
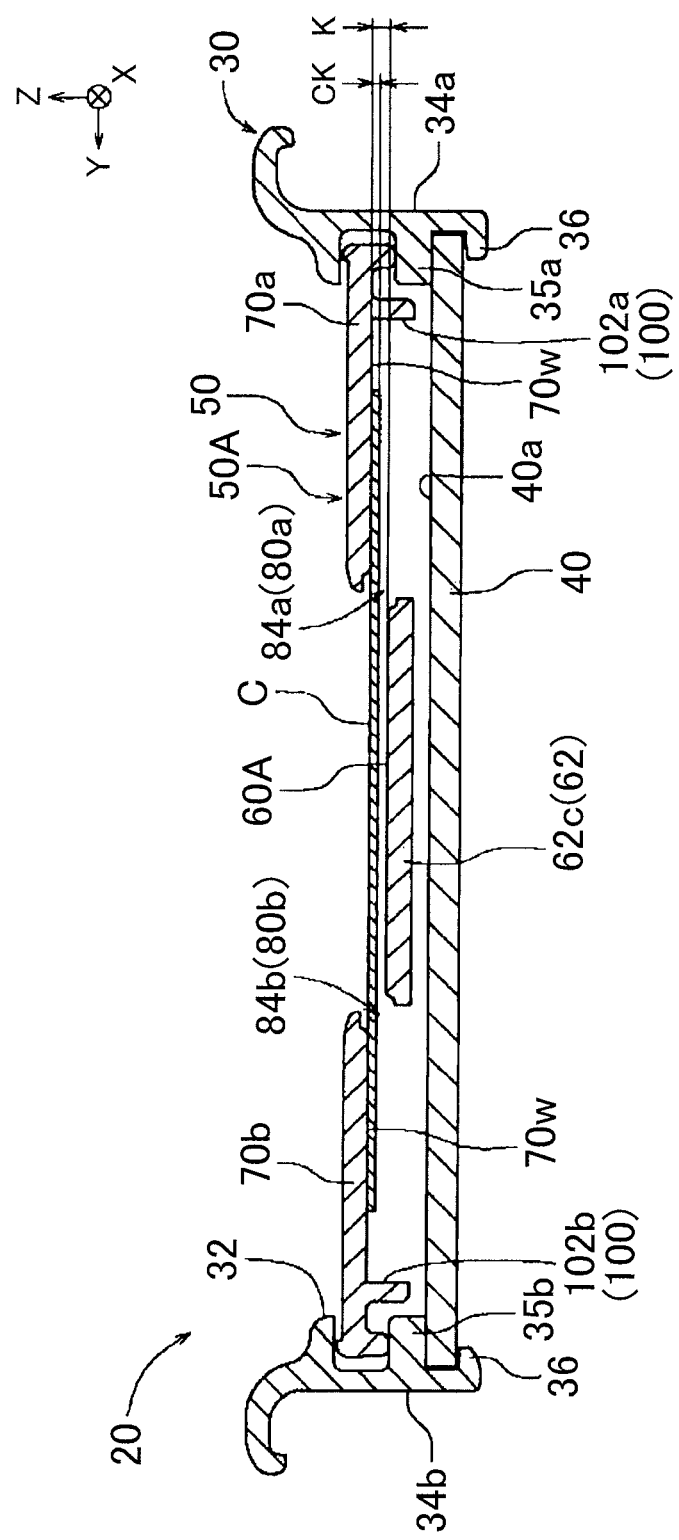
FIG. 9 is an enlarged end view taken along the arrow IX-IX of FIG. 5.

As shown in FIG. 4, the mirror 40 has an oblong shape. As shown in FIGS. 8 and 9, the mirror 40 is supported on the mirror supports 36 with a mirror surface 40a facing the window 32. The mirror 40 is not movable relative to the frame 30.

Figure 6:
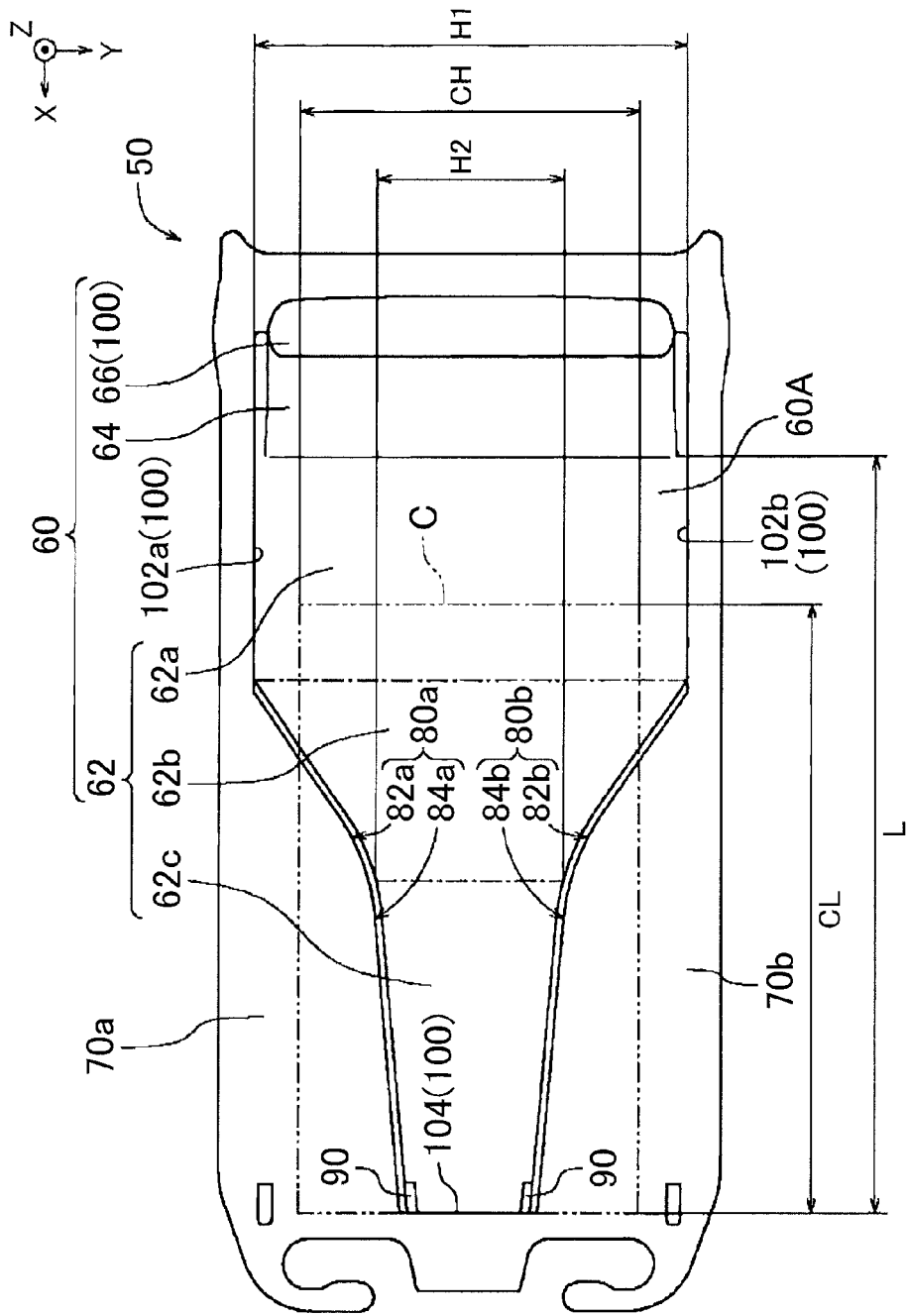
FIG. 6 is a plan view of the mirror cover.

As shown in FIGS. 4 and 6, the mirror cover 50 has a plate-like and, in a plan view, oblong shape. As shown in FIGS. 8 and 9, both sides of the mirror cover 50 in the width direction are slidably supported on the frame rails 35a, 35b. The mirror cover 50 can slide into and out of the frame 30 through the slide opening 37 (see FIG. 4). By thus sliding, the mirror cover 50 slides between a closed position (see FIG. 1) in which the mirror cover 50 is disposed inside the frame 30 and covers the mirror 40 and an open position (see FIG. 2) in which the mirror cover 50 is disposed at a position out of the frame 30 and reveals the mirror 40. In the position out of the frame 30, the mirror cover 50 is guided inside the visor main body 10 by the shell body rails 16a, 16b. Thus, the mirror cover 50 is a slide component that is slidable relative to the visor main body 10. The amount of sliding of the mirror cover 50 in the opening direction is restricted by the shell body stoppers 18. The amount of sliding of the mirror cover 50 in the closing direction is restricted by the frame stopper 39. The opening direction and the closing direction of the mirror cover 50 coincide with the longitudinal direction of the visor main body 10 (X-axis direction).

The mirror cover 50 constitutes a card holder described below on the side of an outer face 50A that is exposed through the window 32 in the closed position shown in FIGS. 1 and 5. The card holder is so configured that a card C, such as a name card, is inserted into and extracted from clearances 80a, 80b (see description below) of the mirror cover 50. A direction D1 in which the card is inserted into the mirror cover 50 coincides with the opening direction of the mirror cover 50. A direction D2 in which the card is extracted coincides with the closing direction of the mirror cover 50. In the following description, the longitudinal direction, the width direction, and the thickness direction refer respectively to the longitudinal direction (X-axis direction), the width direction (Y-axis direction), and the thickness direction (Z-axis direction) of the mirror cover 50.

Figure 7:
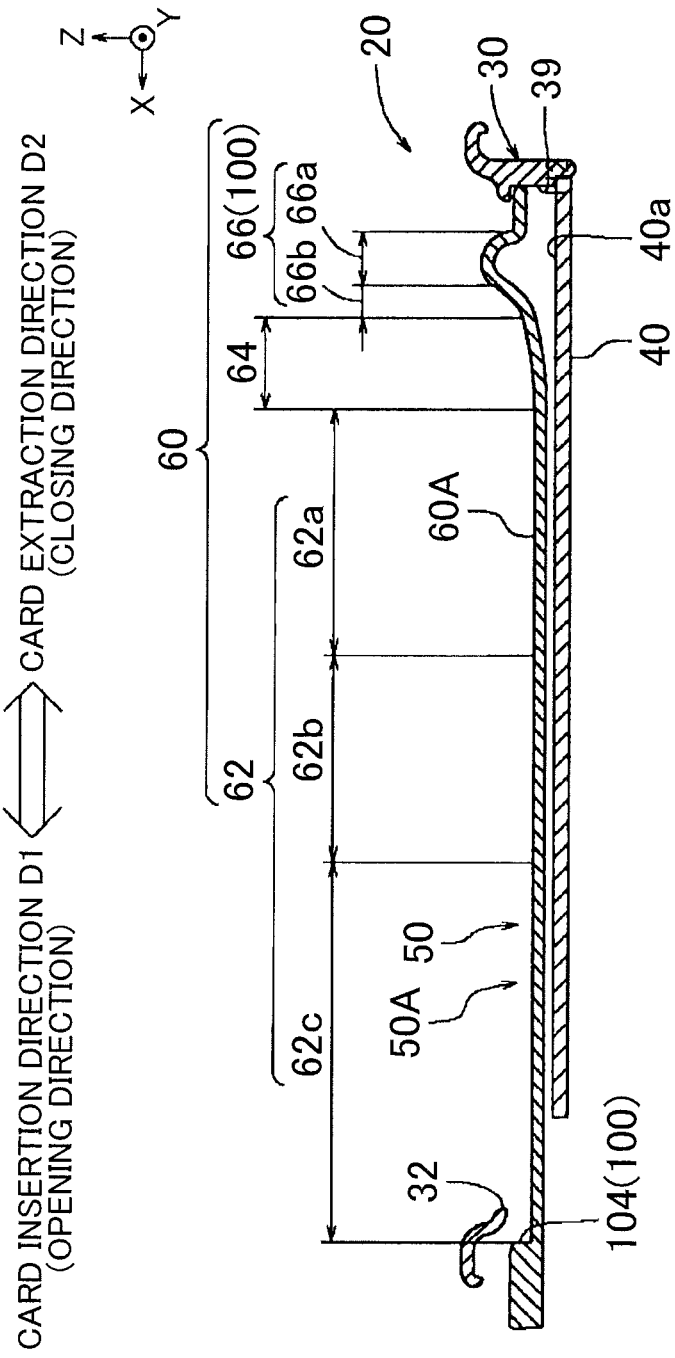
FIG. 7 is an end view taken along the arrow VII-VII of FIG. 5.

The mirror cover 50 (see FIGS. 4 and 6) has a slide main body 60, a pair of card holding parts 70a, 70b, a stopper 100, and anti-slipout protrusions 90. As shown in FIGS. 4 and 7, the slide main body 60 has a plate-like main body-side holding part 62 disposed in parallel to the mirror 40, a grip 66 that is located on the farther side in the card extraction direction D2 relative to the main body-side holding part 62 and protrudes in the thickness direction relative to the main body-side holding part 62, and a slope 64 that is provided between the main body-side holding part 62 and the grip 66 and rises gently in the thickness direction from the main body-side holding part 62 toward the grip 66. The card is not shown in FIGS. 4 and 7.

As shown in FIG. 7, the grip 66 has a grip top 66a and a grip slope 66b. In the sectional side view shown in FIG. 7, the grip top 66a has a round arc shape. The grip top 66a protrudes further to the upper side than the window 32. The grip slope 66b is located between the grip top 66a and the slope 64 and inclined in the thickness direction toward the grip top 66a at a larger gradient than the slope 64. An outer surface 60A from the slope 64 via the grip slope 66b to the grip top 66a continues upward in the thickness direction smoothly without bending. As shown in FIG. 6, the grip 66 and the slope 64 continue in the width direction in a dimension slightly narrower than a width H1 of a lower base to be described later. The grip 66 is gripped to slide the slide main body 60, and serves as the stopper 100 to prevent fall of the card C (see description below).

As shown in FIGS. 6 and 7, the main body-side holding part 62 has a rectangular section 62a, a trapezoidal section 62b, and an elongated section 62c in this order in the card insertion direction D1. In a plan view, the rectangular section 62a has an oblong shape that is horizontally long (long in the width direction). In a plan view, the trapezoidal section 62b has a trapezoidal shape with the width narrowing in the card insertion direction D1. The width H1 of the lower base of the trapezoidal section 62b is larger than a card width CH, while a width H2 of the upper base thereof is smaller than the card width CH. The width H1 of the lower base is equal to the width of the rectangular section 62a. In a plan view, the elongated section 62c has an elongated shape that is slightly tapered in the card insertion direction D1. A length L of the main body-side holding part 62 in the longitudinal direction is larger than a length CL of the card.

As shown in FIG. 6, in a plan view, the card holding parts 70a, 70b are provided as a pair respectively on both sides of the trapezoidal section 62b and the elongated section 62c. The card holding parts 70a, 70b are shaped with both corners of the mirror cover 50 placed so as to correspond to the trapezoidal section 62b and the elongated section 62c. As shown in FIG. 9, the card holding parts 70a, 70b have a plate-like shape, and are located further on the upper side in the thickness direction than the main body-side holding part 62 and disposed in parallel to the main body-side holding part 62.

As shown in FIG. 9, the card holding parts 70a, 70b have the clearances 80a, 80b in the thickness direction from the outer surface 60A of the main body-side holding part 62. A dimension K of the clearances 80a, 80b is larger than a thickness CK of the card C. As shown in FIG. 6, the clearances 80a, 80b include first clearances 82a, 82b provided along both edges of the trapezoidal section 62b, and second clearances 84a, 84b provided along both edges of the elongated section 62c. The first clearance 82a and the second clearance 84a are continuous. The first clearance 82b and the second clearance 84b are continuous. The first clearances 82a, 82b are disposed so as to approach each other in the card insertion direction D1 according to the shape of the trapezoidal section 62b.

As indicated by an arrow Z1 in FIG. 5, the first clearances 82a, 82b constitute a card slot into which the card C is inserted along the outer surface 60A of the main body-side holding part 62. As shown in FIG. 9, when the card C is inserted through the first clearances 82a, 82b, the card C is held between the outer surface 60A of the main body-side holding part 62 and inner surfaces 70w of the card holding parts 70a, 70b. As shown in FIG. 5, both side portions of the card C are held by the card holding parts 70a, 70b, while the entire rest of the card C is held by the main body-side holding part 62. As described above, the dimension K of the clearances 80a, 80b is larger than the thickness CK of the card C. Accordingly, when the card C is inserted into or extracted from the gap between the main body-side holding part 62 and the card holding parts 70a, 70b through the clearances 80a, 80b, the card C encounters no resistance, or the card C encounters a small resistance.

The stopper 100 includes a pair of first upright walls 102a, 102b (see FIGS. 6, 8, and 9), a second upright wall 104 (see FIGS. 6 and 10), and the grip 66 (FIGS. 6 and 7). The grip 66 serves as the stopper 100. The first upright walls 102a, 102b are provided respectively along both edges of the rectangular section 62a, and extend linearly in the card insertion direction D1 to the position corresponding to the leading end of the elongated section 62c. In the thickness direction (see FIGS. 8 and 9), the first upright walls 102a, 102b have a height width straddling the main body-side holding part 62 and the card holding parts 70a, 70b. The second upright wall 104 is provided along the leading end edge of the elongated section 62c. In the thickness direction (see FIG. 10), the second upright wall 104 has a height width straddling the main body-side holding part 62 and the card holding parts 70a, 70b. The frame 30 is not shown in FIG. 10.

Figure 12:
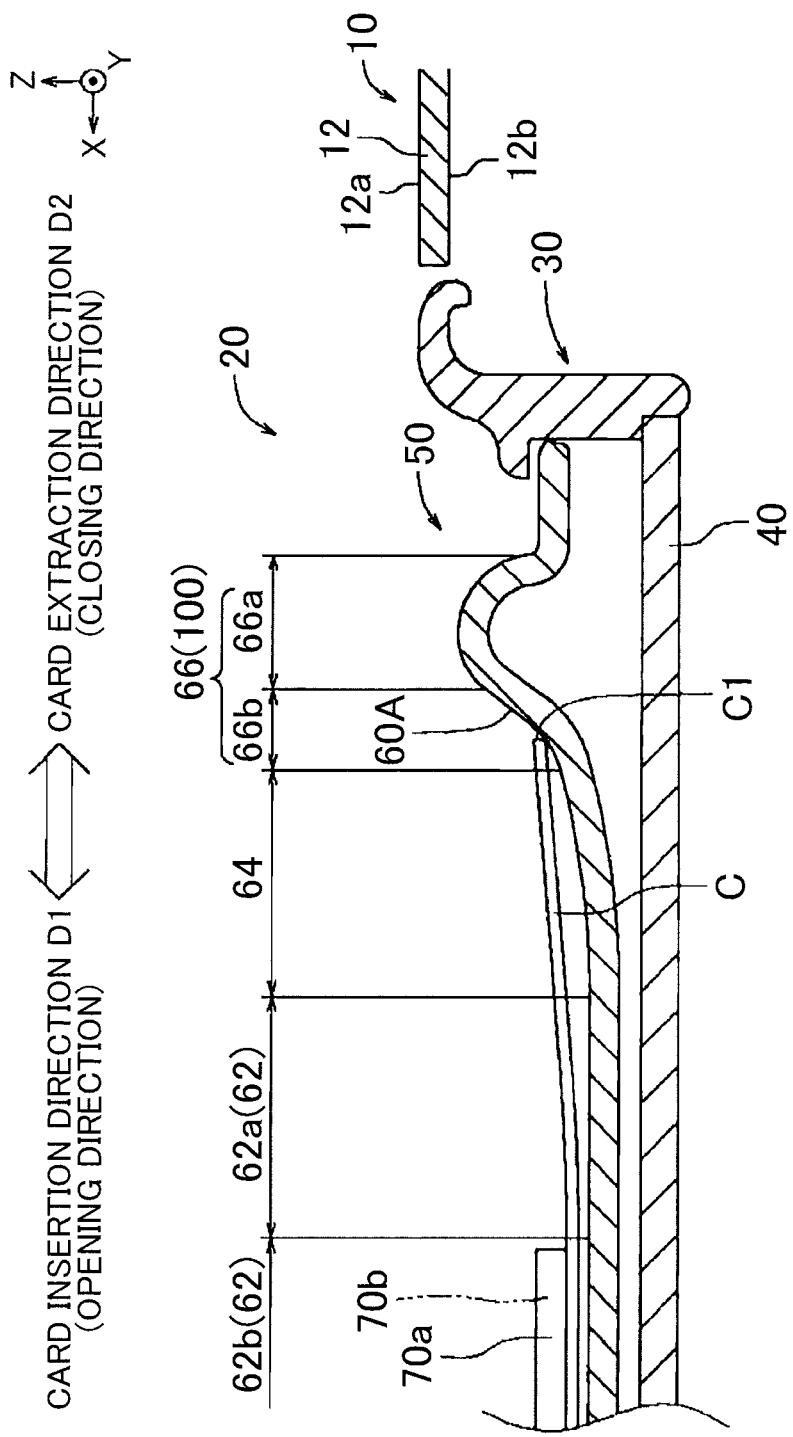
FIG. 12 is an enlarged end view showing how one end of the card is located at a grip slope.

The stopper 100 restricts the amount of movement in the four directions of the card C held between the main body-side holding part 62 and the card holding parts 70a, 70b. The first upright walls 102a, 102b (see FIGS. 6, 8, and 9) restrict the amount of movement of the card C in the width direction. The second upright wall 104 (see FIGS. 6 and 10) restricts the amount of movement of the card C in the card insertion direction D1. The grip 66 (see FIGS. 6 and 7) restricts the amount of movement of the card C in the card extraction direction D2. The stopper function of the grip 66 will be described with FIG. 12. If the card C slips out from the anti-slipout protrusions 90 to be described later and slides in the card extraction direction D2, the sliding of the card C (see FIG. 12) is restricted as an end C1 of the card C on the farther side in the card extraction direction D2 comes into contact with the grip slope 66b while a portion of the card C on the farther side in the card insertion direction D1 is held between the main body-side holding part 62 and the card holding parts 70a, 70b. In this way, the card C is prevented from coming out of the gap between the main body-side holding part 62 and the card holding parts 70a, 70b. In FIG. 12, the portion on the farther side in the card extraction direction D2 in FIG. 7 is shown along with the card holding parts 70a, 70b and the shell body 12.

Figure 10:
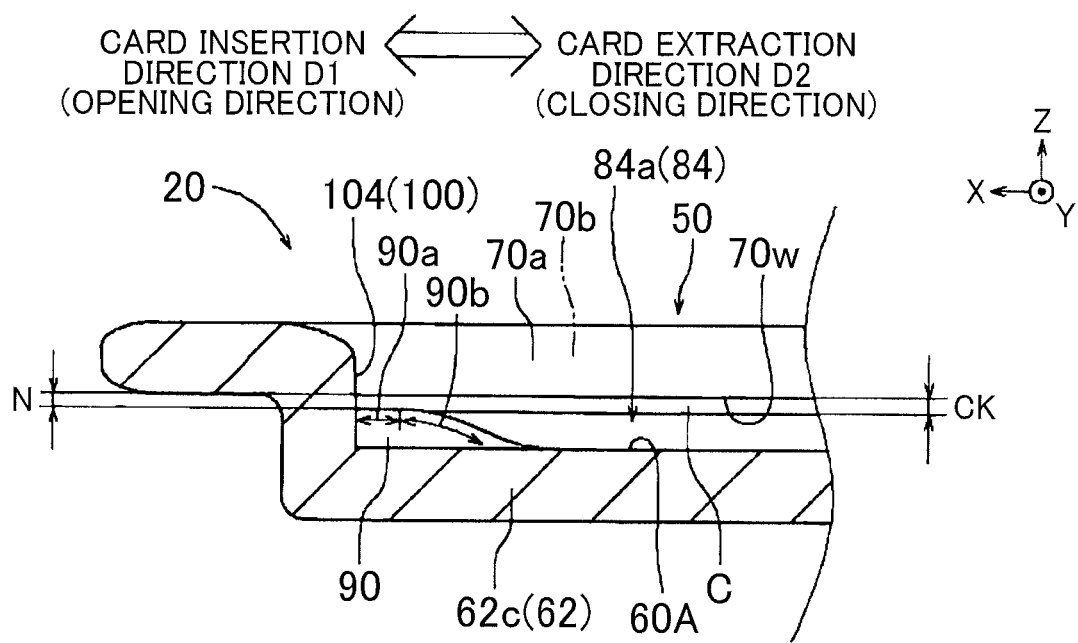
FIG. 10 is an enlarged sectional view taken along the arrow X-X of FIG. 5.
Figure 11:
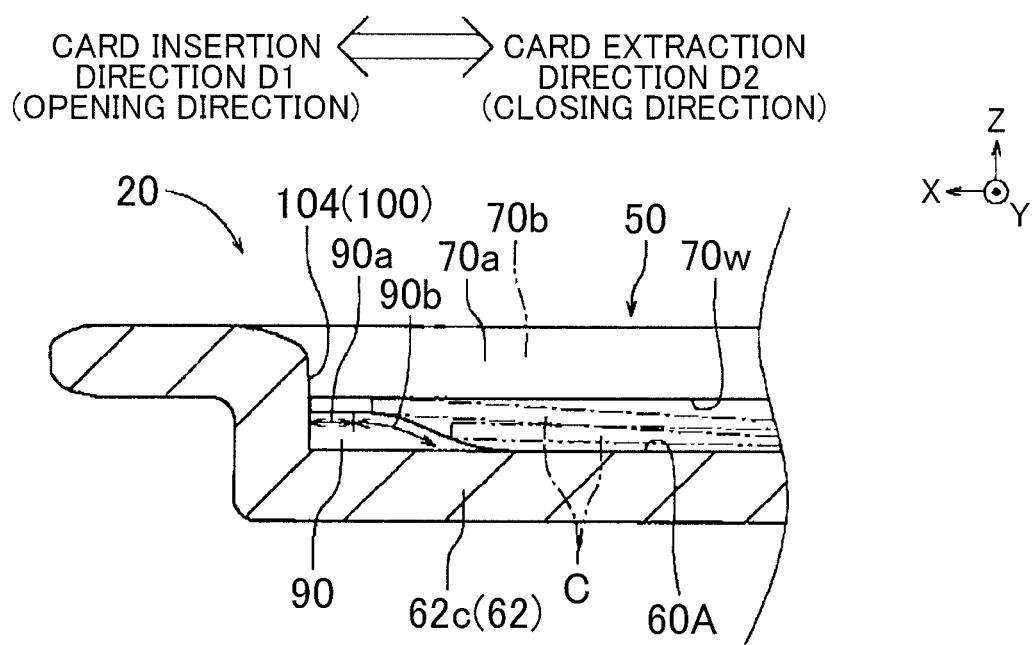
FIG. 11 is an enlarged sectional view showing how a card is inserted in correspondence with FIG. 10.

The anti-slipout protrusions 90 serve the function of holding the card C between the main body-side holding part 62 and the card holding parts 70a, 70b. As shown in FIG. 6, the anti-slipout protrusions 90 are provided respectively at both edges of the leading end of the elongated section 62c. As shown in FIG. 10, the anti-slipout protrusion 90 protrudes in the thickness direction from the outer surface 60A of the elongated section 62c. The anti-slipout protrusion 90 has a top surface 90a continuing to the second upright wall 104, and a slope surface 90b that is located on the farther side in the card extraction direction D2 relative to the top surface 90a and rises gradually in the thickness direction from the outer surface 60A of the elongated section 62c toward the top surface 90a. In the side view shown in FIG. 10, the top surface 90a has a clearance N in the thickness direction from the inner surfaces 70w of the card holding parts 70a, 70b. The clearance N is smaller than the thickness CK of the card C. Accordingly, when the card C has been inserted into the gap between the main body-side holding part 62 and the card holding parts 70a, 70b to the leading end of the elongated section 62c, the card C is guided by the slope surface 90b as indicated by the two-dot dashed line in FIG. 11, and then is held in the thickness direction between the top surface 90a and the inner surfaces 70w of the card holding parts 70a, 70b as indicated by the one-dot dashed line in FIG. 11. When having been inserted to the innermost side in the card insertion direction D1, the card C is prevented from slipping out by being positioned by the second upright wall 104 and held between the top surface 90a and the card holding parts 70a, 70b (see FIG. 10).

As has been described above, the mirror cover 50 functions as a card holder that is slidable relative to the visor main body 10 (see FIGS. 1 and 2). The opening direction of the mirror cover 50 coincides with the card insertion direction D1. Accordingly, the directions of operations of inserting the card C into the mirror cover 50 and opening the mirror cover 50 are the same, which is convenient for a user, for example, when performing both operations successively one after the other. It is convenient that the operation directions are also the same when the mirror cover 50 is closed and then the card C is extracted. As already described, the dimension K (see FIG. 9) of the clearances 80*a*, 80*b* is larger than the thickness CK of the card C, so that the card C encounters no resistance or a small resistance when the card C is inserted into the clearances 80*a*, 80*b*. Thus, even when the card insertion direction D1 and the opening direction of the mirror cover 50 are the same, the user is prevented from unintentionally opening the mirror cover 50 when inserting the card C into the clearances 80*a*, 80*b*.

Figure 13:
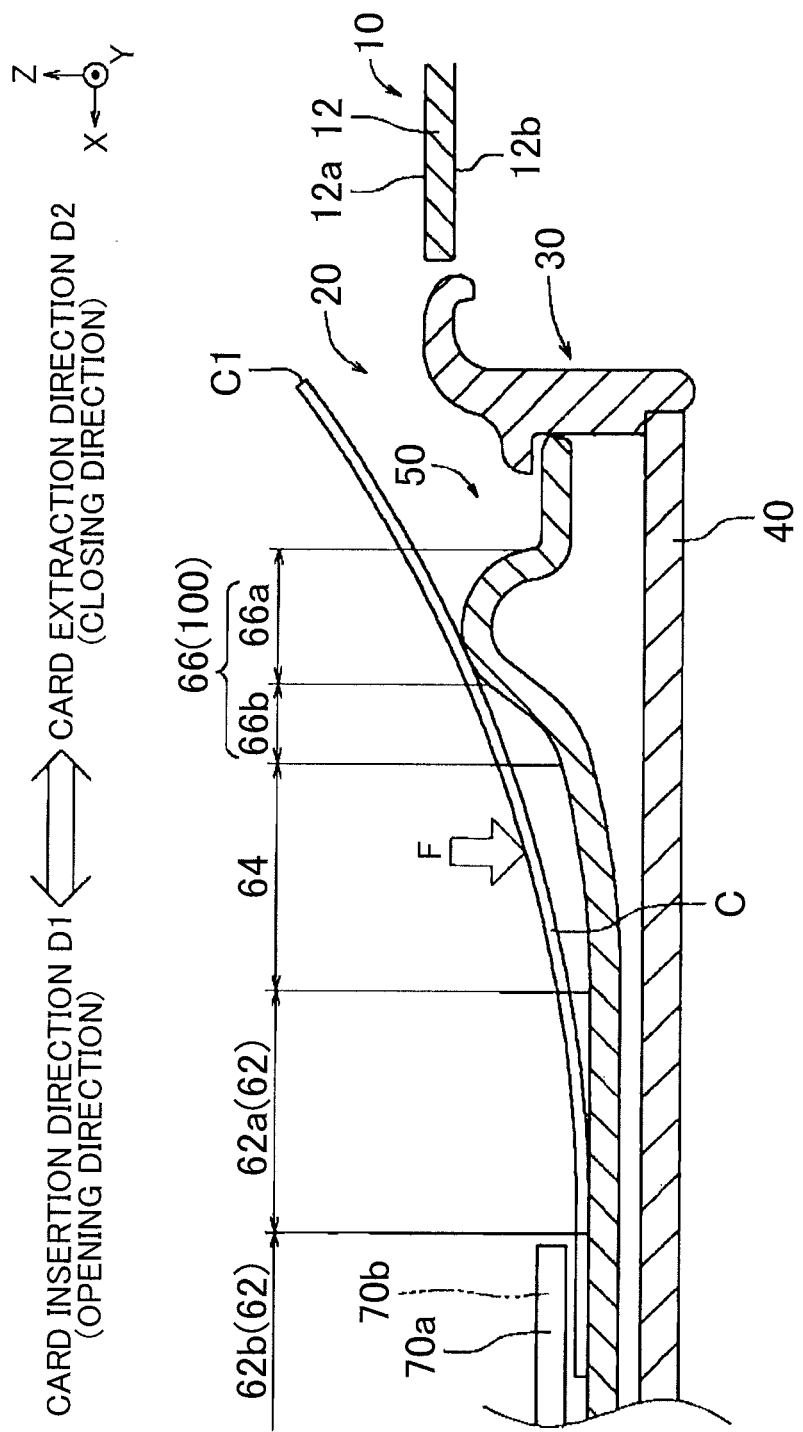
FIG. 13 is an enlarged end view showing how the card is extracted.

When the card C is being extracted, the slope 64 and the grip 66 function as follows (see FIGS. 12 and 13). In FIGS. 12 and 13, the portion on the farther side in the card extraction direction D2 in FIG. 7 is shown along with the card holding parts 70*a*, 70*b* and the shell body 12. When the card C is slid in the card extraction direction D2, the card C is gradually guided upward in the thickness direction by the slope 64 and the grip slope 66*b* as shown in FIG. 12. Thereafter, as shown in FIG. 13, the card C is guided to the upper side of the grip top 66*a* while deflecting at a position corresponding to the slope 64 and the grip slope 66*b* in response to pressing by the user's finger. In FIG. 13, the card C is pressed by the user's finger at the position indicated by an arrow F. According to the height of the protrusion of the grip top 66*a*, the end C1 of the extracted card C on the farther side in the card extraction direction D2 is lifted from the frame 30 and an outer face 12*a* of the shell body 12. Thus, the user can easily grasp the card C by inserting the finger between the card C and the frame 30 (or the outer face 12*a* of the shell body 12). As already described, the slope 64, the grip slope 66*b*, and the grip top 66*a* of the outer surface 60A are smoothly continuous. Accordingly, when the card C is being extracted, the card C slides smoothly from the slope 64 to the grip top 66*a*.

As shown in FIG. 6, the card holding parts 70*a*, 70*b* are disposed with an interval therebetween kept from the base end of the trapezoidal section 62*b* to the leading end of the elongated section 62*c*. Accordingly, to extract the card C, the user can put the hand on the card C at the leading end of the elongated section 62*c* and slide the card C from there along the elongated section 62*c* in the card extraction direction D2. It is easy to release the card C from the state of being prevented from slipping out, since the card C can be extracted with one hand put at the leading end of the elongated section 62*c* where the anti-slipout protrusions 90 are provided.

In the above embodiment, the mirror cover 50 constitutes the card holder, so that the number of components mounted on the visor main body 10 can be reduced and the structure of the visor main body 10 is simplified compared with when the mirror cover 50 and the card holder are separately provided on the visor main body 10. Moreover, as the grip 66 combines the functions of a knob and a stopper, the structure of the mirror cover 50 is simplified compared with when parts corresponding to these functions are separately provided on the mirror cover 50.

While the embodiment of the present invention has been described in relation to the drawings, the present invention is not limited to the structure, configuration, external appearance, shape, etc. described in the above embodiment, but various modifications, additions, and omissions can be made as far as no change is made to the gist of the present invention. For example, the card holding part may be only one of the card holding parts 70*a*, 70*b*. The number of the anti-slipout protrusions 90 may be one or more than two. The sliding direction of the mirror cover 50 and the extraction direction of the card C do not have to coincide with each other, and, for example, these directions may be orthogonal to each other. The dimension K of the clearances 80*a*, 80*b* may be substantially equal to the thickness CK of the card C. The card holder does not have to be provided on the mirror cover 50 but may be provided on any member that is provided so as to be slidable relative to the visor main body 10. For example, a card holder having a configuration similar to that of the above embodiment may be formed in a plate-like light-blocking extension part that is slidable relative to the visor main body 10 and serves to extend the light-blocking area of the visor main body 10 in the longitudinal direction or the width direction.

What is claimed is:

1. A vehicle sun visor comprising:
    a visor main body; and
    a slide component slidably mounted on the visor main body and including:
        a slide main body;
        card holding parts provided so as to have clearances from the slide main body in a thickness direction;
        a stopper that restricts an amount of movement of a card inserted through the clearances into a gap between the slide main body and the card holding parts, the card moving along a surface of the slide main body; and
        a grip that protrudes from the slide main body, is gripped to slide the slide component relative to the visor main body, and serves as a part of the stopper.

2. The vehicle sun visor according to claim 1, wherein:
    a mirror is mounted on the visor main body; and
    the slide component is a mirror cover that moves between a closed position in which the slide component covers the mirror and an open position in which the slide component reveals the mirror.

3. The vehicle sun visor according to claim 1, wherein:
    a card slot into which the card is inserted is provided between the slide main body and the card holding parts; and
    a direction in which the card is inserted through the card slot along the surface of the slide main body and a direction in which the slide component is slid relative to the visor main body coincide with each other.

4. The vehicle sun visor according to claim 3, wherein the clearances between the slide main body and the card holding parts are larger than the thickness of the card.

5. The vehicle sun visor according to claim 1, wherein the clearances between the slide main body and the card holding parts are larger than the thickness of the card.

6. The vehicle sun visor according to claim 1, wherein:
    the grip protrudes in the thickness direction relative to a plate-like main body-side holding part of the slide main body; and
    a slope that rises gradually in the thickness direction relative to the plate-like main body-side holding part extends from the main body-side holding part to the grip.

7. The vehicle sun visor according to claim 6, wherein at least part of the slope between the main body-side holding part and the grip is concave.

8. The vehicle sun visor according to claim 1, wherein:
    the grip restricts movement of the card in an extraction direction of the card; and the stopper further comprises walls that restrict movement of the card in a width direction perpendicular to the extraction direction, the walls moving with the slide main body as it slides relative to the visor main body.

9. The vehicle sun visor according to claim 8, wherein:
a mirror is mounted on the visor main body;
the slide component is a mirror cover that moves between a closed position in which the slide component covers the mirror and an open position in which the slide component reveals the mirror; and
the walls are located inward in the width direction of a frame through which the mirror is exposed.

10. The vehicle sun visor according to claim 1, wherein an anti-slipout protrusion configured to hold the card protrudes in the thickness direction toward the card holding parts from an end of the slide main body opposite the grip.

11. The vehicle sun visor according to claim 10, wherein a top surface of the anti-slipout protrusion and inner surfaces of the card holding parts are spaced apart from each other in the thickness direction by a clearance that is less than the thickness of the card.

* * * * *